United States Patent
Roshanzamir

(10) Patent No.: US 10,122,040 B2
(45) Date of Patent: Nov. 6, 2018

(54) REACTANT MANIFOLDS FOR FUEL CELL STACKS OPERATING BELOW FREEZING

(71) Applicants: Daimler AG, Stuttgart (DE); Ford Motor Company, Dearborn, MI (US)

(72) Inventor: Alireza Roshanzamir, Burnaby (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 480 days.

(21) Appl. No.: 14/697,874

(22) Filed: Apr. 28, 2015

(65) Prior Publication Data

US 2015/0340724 A1    Nov. 26, 2015

(51) Int. Cl.
*H01M 8/24*      (2016.01)
*H01M 8/04*      (2016.01)
*H01M 8/2484*    (2016.01)
*H01M 8/04291*   (2016.01)
*H01M 8/2485*    (2016.01)
*H01M 8/1018*    (2016.01)

(52) U.S. Cl.
CPC ..... *H01M 8/2484* (2016.02); *H01M 8/04291* (2013.01); *H01M 8/2485* (2013.01); *H01M 2008/1095* (2013.01); *Y10T 29/4911* (2015.01)

(58) Field of Classification Search
CPC ..... H01M 2008/1095; H01M 8/04291; H01M 8/2485; Y10T 29/4911
See application file for complete search history.

(56) References Cited

U.S. PATENT DOCUMENTS

| | | | | |
|---|---|---|---|---|
| 2002/0164514 A1* | 11/2002 | Kelley | ........ | H01M 8/2485 429/460 |
| 2005/0233201 A1* | 10/2005 | Yoshizawa | ........ | H01M 8/0267 429/442 |
| 2008/0241607 A1* | 10/2008 | Owejan | ........ | H01M 8/0258 429/444 |
| 2011/0132477 A1* | 6/2011 | Chen | ........ | H01M 8/0258 137/561 A |
| 2012/0058411 A1* | 3/2012 | Kobayashi | ........ | H01M 8/241 429/465 |
| 2015/0255810 A1* | 9/2015 | Kells | ........ | H01M 8/04768 429/434 |

FOREIGN PATENT DOCUMENTS

WO    WO 2014045019 A1 *    3/2014    ........ H01M 8/04768

* cited by examiner

*Primary Examiner* — Barbara L Gilliam
*Assistant Examiner* — Adam A Arciero
(74) *Attorney, Agent, or Firm* — Stephan A. Pendorf; Patent Central LLC

(57) ABSTRACT

At below freezing temperatures, ice blockages can be prevented in the reactant outlet manifolds of solid polymer electrolyte fuel cell stacks by modifying the internal design of the manifolds. The reactant outlet manifold comprises a divider dividing the manifold into an upper duct section and a lower main flow section and the divider comprises a plurality of ports fluidly connecting the duct section to the main flow section. The reactant manifold also comprises at least one separating wall in the duct section which partially separates the ports from one another in the duct section.

13 Claims, 4 Drawing Sheets

REACTANT MANIFOLDS FOR FUEL CELL STACKS OPERATING BELOW FREEZING

BACKGROUND

Field of the Invention

This invention relates to modifications in the reactant outlet manifolds of fuel cell stacks in order to prevent the formation of ice blockages at below freezing temperatures. It particularly relates to modifications in the oxidant outlet manifolds of solid polymer electrolyte fuel cell stacks.

Description of the Related Art

Fuel cells such as solid polymer electrolyte or proton exchange membrane fuel cells electrochemically convert reactants, namely fuel (such as hydrogen) and oxidant (such as oxygen or air), to generate electric power. Solid polymer electrolyte fuel cells generally employ a proton conducting, solid polymer membrane electrolyte between cathode and anode electrodes. A structure comprising a solid polymer membrane electrolyte sandwiched between these two electrodes is known as a membrane electrode assembly (MEA). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1V, a plurality of cells is usually stacked together in series for commercial applications in order to provide a higher output voltage. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields may be formed on the electrochemically inactive surfaces of the flow field plates and thus can distribute coolant relatively evenly throughout the cells while keeping the coolant reliably separated from the reactants.

Reactant and coolant manifolds are generally used to provide both reactants and the coolant to and from the individual cells in the stack. A variety of designs can be considered in this regard. For instance, a series of ports or ducts can be provided in various manners at opposing ends of the plates for individual cells such that when the cells are stacked together they form manifolds for these fluids. Further design features that may be required then are passageways to distribute the bulk fluids to and from the various channels in the reactant and coolant flow field channels in the plates. These passageway regions are referred to as the transition regions. The various transition regions can themselves comprise numerous fluid distribution channels, e.g. fuel transition channels in a fuel transition region.

In fuel cell stacks subject to freezing temperatures, accumulations of liquid water can be problematic because, when the water freezes, the ice formed can undesirably block fluid flows and the associated expansion of the solid ice can cause damage to cells in the fuel cell stack. Significant sized accumulations of liquid water which may be subject to freezing are therefore generally avoided, either by preventing accumulation in the first place or alternatively by removing them before they have the opportunity to freeze. For these and other reasons, various designs and techniques are disclosed in the art for managing and controlling water movement within a fuel cell stack.

Despite the advances made to date, there remains a need for better designs and methods to prevent ice blockages from occurring in such fuel cell stacks when subzero temperatures may be encountered. This invention fulfills these needs and provides further related advantages.

SUMMARY

When a fuel cell stack is shutdown and stored below freezing temperature, ice can form and cause blockages wherever liquid water had accumulated. In a solid polymer electrolyte fuel cell stack, liquid water can accumulate in the reactant outlet manifolds, and particularly an oxidant outlet manifold. Such ice blockages can be prevented by modifying the internal design of the manifold to include both an appropriate divider having a plurality of ports and at least one appropriate separating wall. The present purpose of such modifying is to prevent ice blockages in the reactant outlet manifolds. However, the invention is essentially a design and method for separating liquid water in these manifolds.

Specifically, the invention pertains to a solid polymer electrolyte fuel cell stack comprising a plurality of solid polymer electrolyte fuel cells stacked in series, and in which each fuel cell comprises an anode, a cathode, a solid polymer electrolyte, at least one reactant inlet duct, and at least one reactant outlet duct. The stack also comprises a reactant outlet manifold having a length, width, and height. The reactant outlet manifold comprises a manifold outlet and a plurality of manifold inlets fluidly connected to the reactant outlet ducts of each fuel cell. To avoid water accumulation and ice blockages in the reactant outlet manifold, a divider is incorporated which divides the manifold into an upper duct section directly connected to the manifold inlets and a lower main flow section directly connected to the manifold outlet. The divider also comprises a plurality of ports fluidly connecting the duct section to the main flow section. In addition, at least one separating wall is incorporated in the duct section which partially separates the manifold inlets in the duct section and partially separates the ports in the duct section in an appropriate manner. In many embodiments, a plurality of separating walls is incorporated in the duct section.

The invention is particularly useful for preventing ice blockages in the oxidant outlet manifolds of such fuel cell stacks. However, it may also be used in the fuel outlet manifolds of the fuel cell stacks as well.

The invention can be applied in stacks in which each fuel cell comprises greater than or equal to three oxidant outlet ducts. Further, the stacks can comprise greater than or equal to 150 fuel cells in series.

The divider can be located such that each of the duct and main flow sections is about the same size. The divider can thus be located such that the height of the duct section is about half the height of the reactant outlet manifold.

In the duct section of embodiments comprising a plurality of separating walls, the separating walls partially separate the plurality of manifold inlets into groups. Each group of these manifold inlets can fluidly connect to the outlet ducts of a number N of fuel cells in the stack. The invention can be applied in stacks in which N is greater than or equal to about 30 (i.e. 30 fuel cells per group). The separating walls provide partial, but not complete, separation in the duct section. An appropriate amount of separation can be provided by having the separating walls extend across about 0.8 of the width of the reactant outlet manifold.

The ports in the divider guide outlet reactant fluids from the duct section to the main flow section and also serve as drains for liquid water. In one appropriate embodiment, each port is partially separated from the other ports by a pair of the separating walls. In some embodiments, each port can be located adjacent a first one of the pair of the separating walls and distant from the second one of the pair of the separating walls. In addition, each port can be located on the side of the divider opposite the reactant outlet ducts. In embodiments where the separating walls separate the manifold inlets into groups connected to N fuel cells, an appropriate open area for the ports can be about 1/16 of the product of the length and width of the reactant outlet manifold divided by N.

To assist in the drainage of water, the divider can be tilted downwards from the second one towards the first one of the pair of the separating walls (e.g. tilted at about 20 degrees). Further, the surface of the divider can comprise wicking features to assist in the movement of liquid water.

The structures which need to be included in the reactant outlet manifold can easily be incorporated by way of a unitary insert which comprises the divider, the plurality of ports, and the separating wall or walls. To prevent electrically shorting the adjacent fuel cells in the stack, the unitary insert is generally electrically insulating.

These and other aspects of the invention are evident upon reference to the attached Figures and following detailed description.

BRIEF DESCRIPTION OF THE DRAWINGS

FIG. 1b shows an enlarged view of the inlets in the oxidant outlet manifold which fluidly connect to the oxidant outlet ducts of the fuel cells in the stack of FIG. 1a.

FIG. 2b shows an enlarged view of a repeating unit in the embodiment of FIG. 2a.

DETAILED DESCRIPTION

In this specification, words such as "a" and "comprises" are to be construed in an open-ended sense and are to be considered as meaning at least one but not limited to just one.

Herein, in a quantitative context, the term "about" should be construed as being in the range up to plus 10% and down to minus 10%.

Herein, the length direction of the reactant outlet manifold is defined by the stacking direction of the fuel cells in the stack (often the longest dimension of the stack). The height direction of the reactant outlet manifold depends on the orientation of the stack with respect to gravity and is parallel to the direction of gravity. Finally, the width direction is orthogonal to the length and height directions.

Throughout the specification, the term "partially separated" is used in context with the separation walls in the duct section of a reactant manifold. These separation walls appear at various locations along the length of the reactant manifold and provide a partial, and not complete, restriction to the flow of fluids (gases or liquids) along the length of the duct section of the reactant manifold. As a consequence, the flows between the manifold inlets, which are connected to the duct section of the reactant manifold, are also restricted in part by these separating walls. In this sense then, a manifold inlet or group of manifold inlets located between a pair of separating walls along the length of the reactant manifold are thus "partially separated" from the other manifold inlets or groups of manifold inlets. In a like manner, a port or group of ports located between a pair of separating walls along the length of the reactant manifold are thus "partially separated" from the other ports or groups of ports.

Figure 1A:
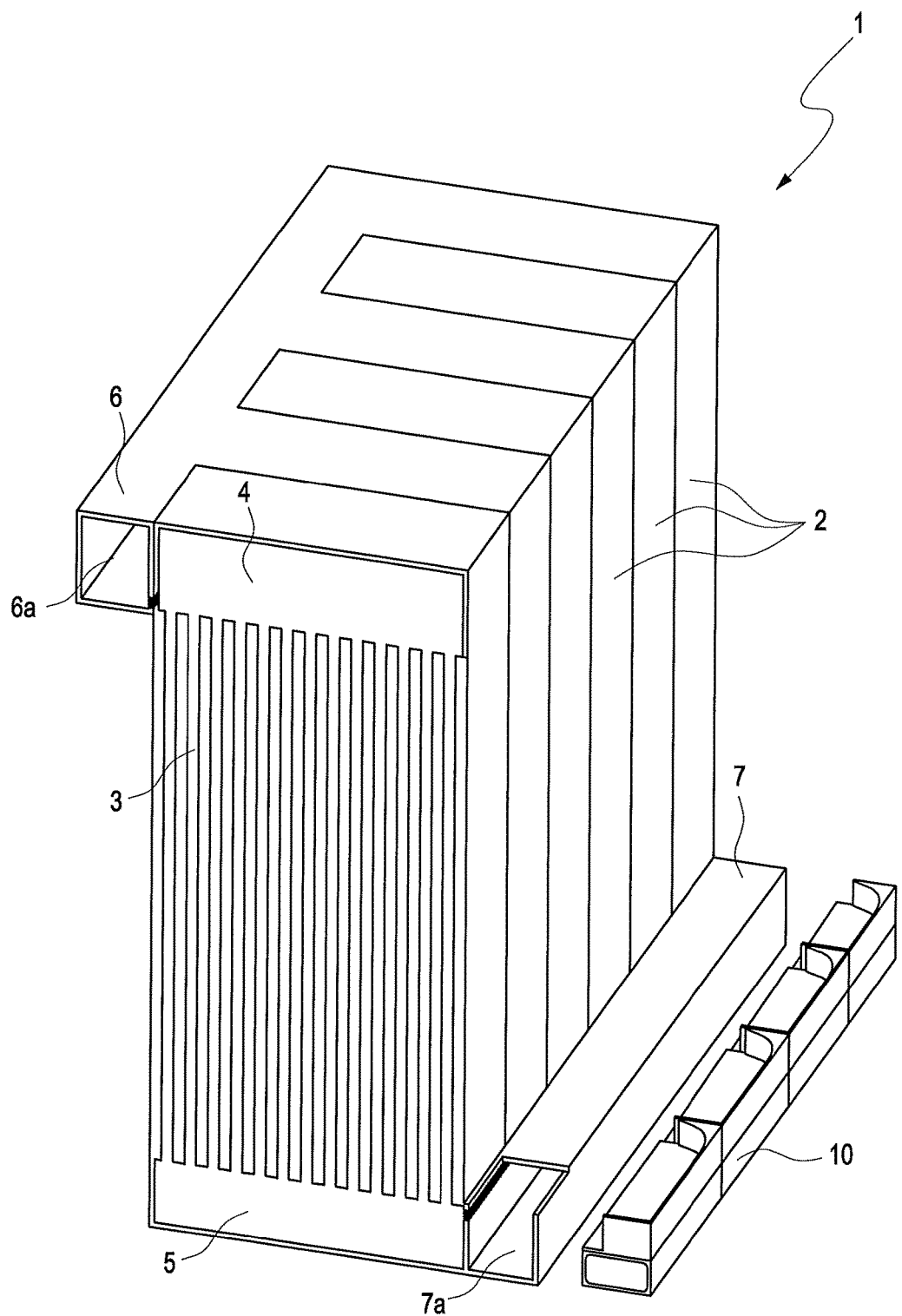
FIG. 1a shows a schematic cross-section of an exemplary solid polymer electrolyte fuel cell stack (in which a flow field plate is exposed). An insert of the invention is shown removed from, and adjacent to, the oxidant outlet manifold.

A schematic view of an exemplary solid polymer electrolyte fuel cell stack suitable for automotive purposes is shown in cross-section in FIG. 1a. Fuel cell stack 1 comprises a series stack of generally rectangular, planar solid polymer electrolyte fuel cells 2. The cross-section exposes oxidant flow field plate 3 which comprises a plurality of parallel, linear flow field channels, oxidant inlet transition region 4 and oxidant outlet transition region 5. Stack 1 also comprises oxidant inlet manifold 6 and oxidant outlet manifold 7 which both run along the length of stack 1.

Oxidant (air) enters oxidant inlet manifold 6 at inlet 6a at a relatively high velocity for distribution purposes. The opposite end of oxidant inlet manifold 6 is closed and thus the oxidant velocity there is relatively low. Oxidant inlet manifold 6 comprises numerous manifold outlets (three per fuel cell in this embodiment) along the length of stack 1 which fluidly connect to respective oxidant inlet ducts in each fuel cell 2. Neither these manifold outlets nor the oxidant inlet ducts are visible in FIG. 1a. In a like manner, after passing through fuel cells 2, the oxygen-depleted oxidant stream exits stack 1 from oxidant outlet manifold 7 at outlet 7a at a relatively high velocity. The opposite end of oxidant outlet manifold 7 is closed and thus the oxidant velocity there is relatively low. Oxidant outlet manifold 7 also comprises numerous manifold inlets (again, three per fuel cell in this embodiment) along the length of stack 1 which fluidly connect to respective oxidant outlet ducts in each fuel cell 2. Again, neither these manifold inlets nor the oxidant outlet ducts are visible in FIG. 1a.

Also shown in FIG. 1a next to oxidant outlet manifold 7 is unitary insert 10 of the invention. For illustration purposes, unitary insert 10 is shown removed from oxidant outlet manifold 7 but is otherwise oriented as it would be if incorporated therein.

Figure 1B:
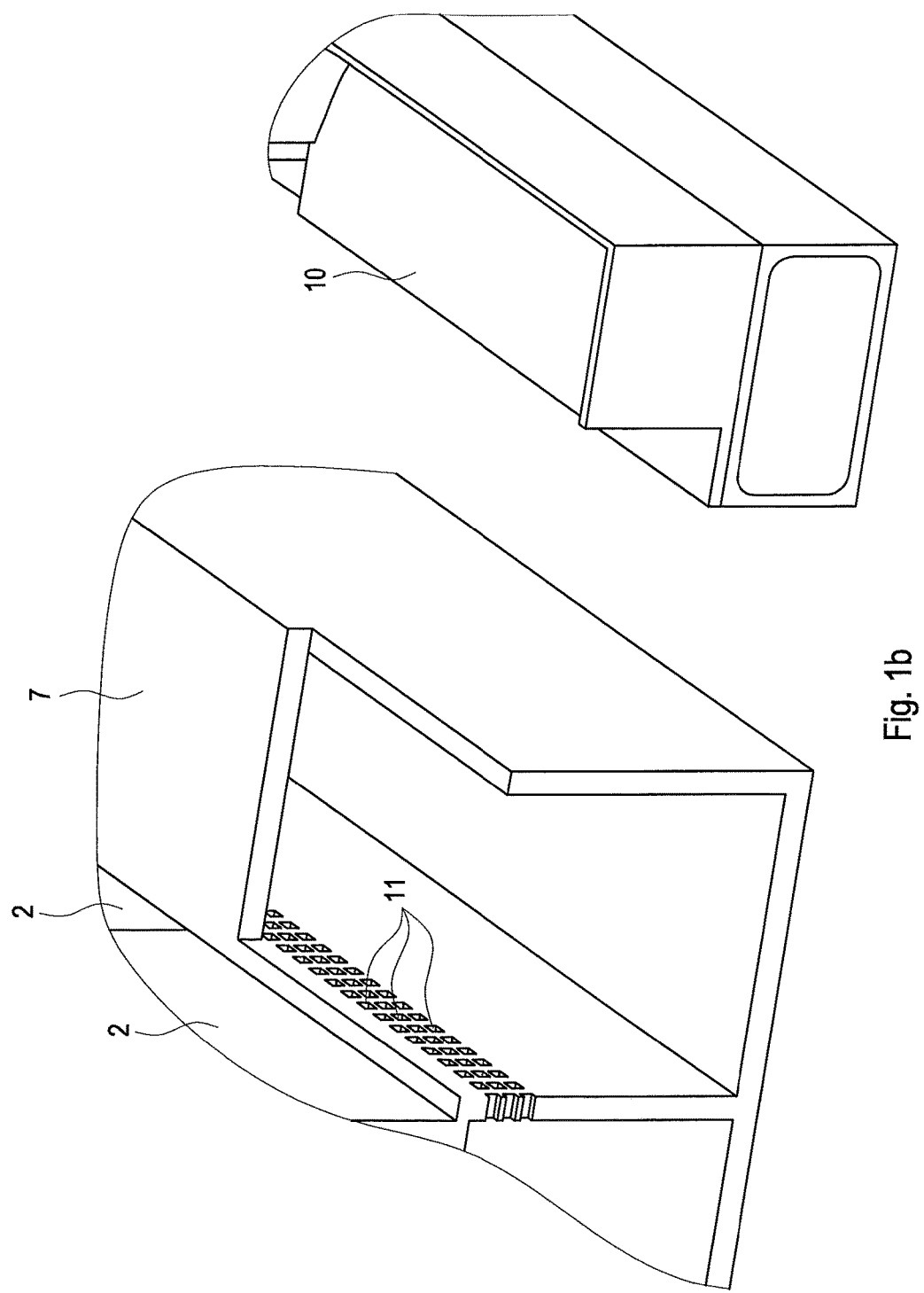

FIG. 1b shows an enlarged view of some of the plurality of inlets in oxidant outlet manifold 7 which fluidly connect to the oxidant outlet ducts (not visible) of the fuel cells inside fuel cell stack 1 of FIG. 1a. Here, inlets 11 (three per fuel cell 2) near outlet 7a of oxidant outlet manifold 7 are shown.

Without inventive unitary insert 10 (or equivalent fixed structure) incorporated in fuel cell stack 1, during normal operation and during purges, a series of jet streams exits fuel cells 2 from their oxidant outlet ducts (not visible) and enters oxidant outlet manifold 7 through the plurality of manifold inlets 11. These jet streams usually contain liquid water. The interactions between these jet streams and the main flow in manifold 7 can create a complex, turbulent flow structure therein, particularly at high loads. For instance, in the closed end region (opposite outlet 7a), the jet streams mainly dominate and there can be strong swirling flow. In the open end region (near outlet 7a), the main flow in manifold 7 dominates and there can be strong shear flow. And in between, both the jet streams and main flow contribute significantly. Overall, the behavior of liquid water in oxidant outlet manifold 7 depends on the location of a particular fuel cell 2 and flow structure around it. Even though the majority of liquid water follows the main flow towards outlet 7a, small amounts of water can remain in manifold 7, and particularly around inlets 11. In the closed end region of manifold 7, liquid water can also accumulate due to the lack of main flow therein.

When fuel cell stack 1 is shutdown and stored, liquid water can move around in manifold 7. Depending on the orientation of stack 1, liquid water can also accumulate in the closed end region of manifold 7 and block inlets 11 or the oxidant outlet ducts connected to them. Consequently, on subsequent exposure to below freezing temperatures, undesirable partial or full ice blockages may form there.

The present invention provides alternative oxidant outlet manifold designs which better manage and control liquid water movement throughout the manifold. These designs serve the following functions: to separate liquid water from gas during stack operation and purge; to minimize the variability of interactions between the jet streams and the main flow in the manifold; and to keep water away from the oxidant outlet ducts after shutdown.

Figure 2A:
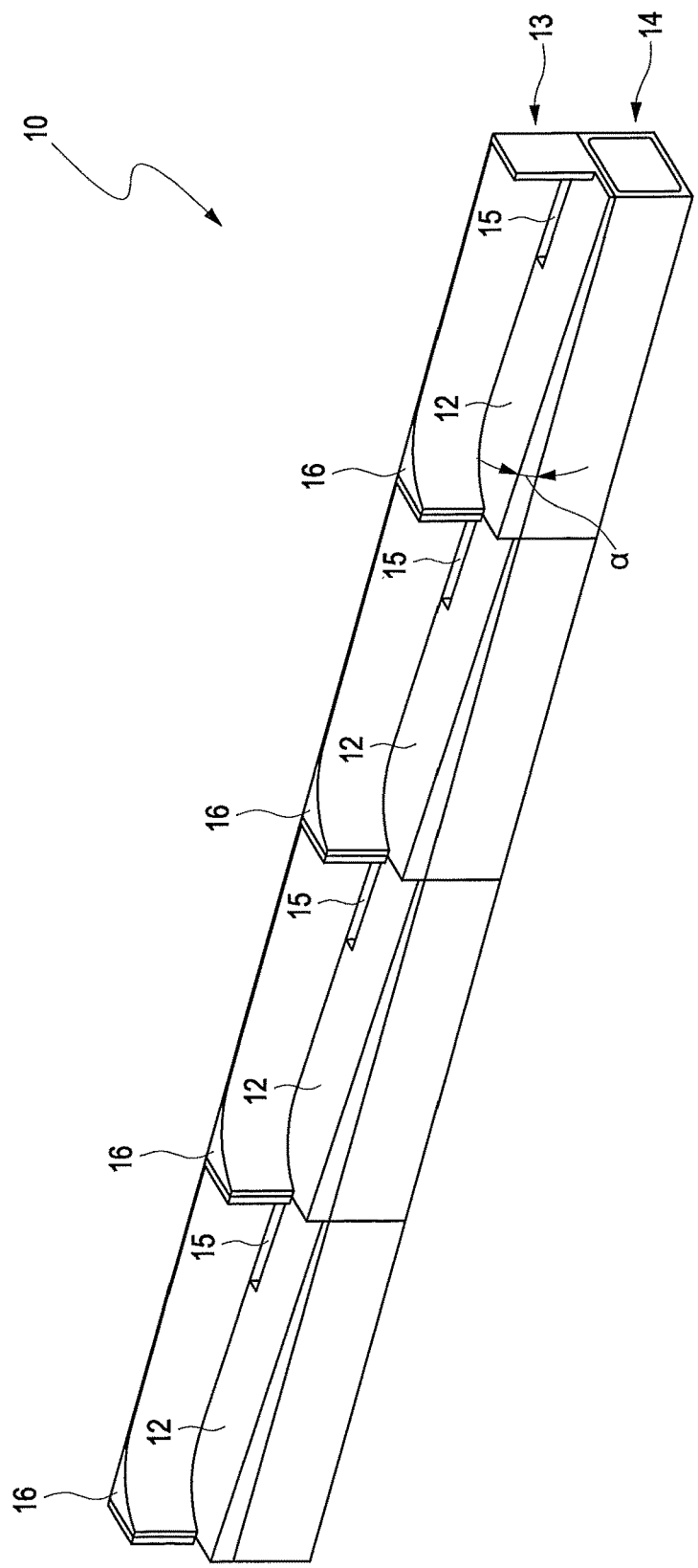
FIG. 2a shows an embodiment of the invention in which separating walls have been provided to partially separate the manifold inlets into 4 groups.

FIG. 2a shows one possible embodiment of the invention, namely unitary insert 10, which also appeared in FIG. 1a. To prevent electrically shorting the adjacent fuel cells in the stack, unitary insert is preferably made of an electrically insulating material. Unitary insert 10 can be conveniently incorporated in (or removed from) oxidant outlet manifold 7. Alternatively, if desired, the same structure could be built into manifold 7 (i.e. the structure and manifold are made as a single piece).

Figure 2B:
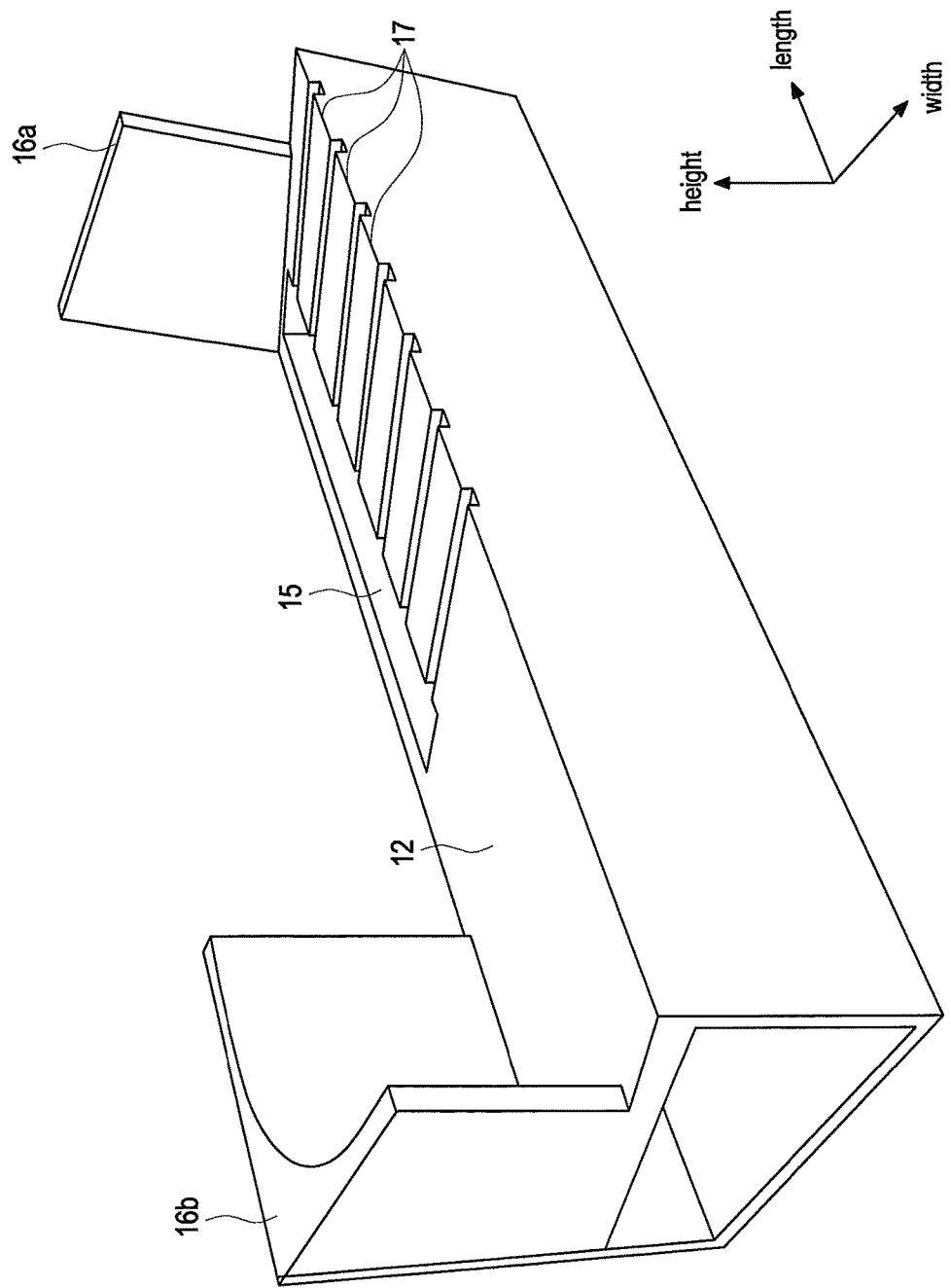

The structure of unitary insert 10 comprises divider 12 which serves to divide oxidant outlet manifold 7 into upper duct section 13 and lower main flow section 14. Upper duct section 13 directly connects to oxidant manifold inlets (not shown). Lower main flow section 14 directly connects to oxidant manifold outlet 7a. Divider 12 comprises a plurality of ports 15 that serve to fluidly connect duct section 13 to main flow section 14. Divider 12 also comprises a plurality of separating walls 16 which partially separate ports 15, as is evident in FIG. 2a. In addition though, when incorporated into manifold 7, the plurality of separating walls 16 also serve to partially separate the oxidant manifold inlets in duct section 13. As depicted in FIG. 2a, separating walls 16 would partially separate the oxidant manifold inlets into four groups. To assist in draining water from duct section 13 into main flow section 14 through ports 15, divider 12 appears in discrete, sloped sections between separating walls 16. The sloped sections make an angle α with respect to the horizontal along the length direction of unitary insert 10. Note that divider 12 could also be sloped with respect to the horizontal along the width direction of unitary insert 10 (not shown in FIG. 2a but is shown in FIG. 2b), again to assist in draining water from duct section 13.

The approach of designs like that of unitary insert 10 in FIG. 2a is ideally to create similar and predictable flow patterns for all the fuel cells in the stack, regardless of their location. In practice, groups of modest size are separated from each other using separating walls 16. For instance, in a fuel cell stack of 150 cells, a practical option is to employ separator walls to separate the jet streams of groups of about 30 fuel cells each from the rest of the jet streams in the other groups.

Using the embodiment of FIG. 2a, both the streamlined walls of unitary insert 10 and streamlined divider 12 direct liquid water toward ports 15, which thus also serve as drainage openings for duct section 13. Divider 12 prevents liquid water moving back up toward inlets 11 and the oxidant outlet ducts which connect to them. Further, liquid water is separated from the gas stream during operation and purge and is thus kept away from the oxidant outlet ducts after shutdown, thereby minimizing the possibility of ice blockages.

Although not essential to do so, the design of unitary insert 10 can conveniently be based on a series of repeating units. FIG. 2b shows an enlarged view of a repeating unit which is similar to that employed in the embodiment of FIG. 2a. The embodiment of FIG. 2b however includes wicking features 17 incorporated on the surface of divider 12 to assist in the movement of liquid water by wicking it towards port 15. A set of axes also appears in FIG. 2b denoting the length, width and height directions referred to herein.

The repeating unit shown in FIG. 2b has a pair of separating walls 16a and 16b. When unitary insert is installed in oxidant outlet manifold 7, a number N of oxidant outlet ducts form a group which is partially separated by separating walls 16a and 16b from the other oxidant outlet ducts or groups of them in oxidant outlet manifold 7. As shown in FIG. 2b, port 15 is located adjacent a first one of the pair of separating walls, namely separating wall 16a, and distant from a second one of the pair of separating walls, namely separating wall 16b. Also as shown, port 15 is located on back side of unitary insert 10 farthest away from the reader (i.e. on the side of divider 12 opposite oxidant outlet ducts).

Those skilled in the art will appreciate that the appropriate number of features and the appropriate dimensions for the features in unitary inserts of the invention will depend on the specifics of the fuel cell stack involved. And it is expected that those in the art will be able to make appropriate determinations in this regard based on the preceding disclosure. As further guidance however, in exemplary embodiments, the divider can be located such that each of the duct and main flow sections is about the same size (e.g. height of the duct section about half the height of the reactant outlet manifold). Consideration should be given to minimizing the potential for flow sharing from cell to cell. Consideration also should be given to the surface profile and features on the divider (e.g. such as slope, wettability, wicking features) to provide for enhanced water transport.

With regards to the size of the separating walls, they are preferably smaller than the width of the manifold to prevent blocking the oxidant outlet ducts and also to provide a secondary escape path for the jet streams in the worst case when there are blockages. For instance, an appropriate amount of separation can be provided by having the separating walls extend across about 0.8 of the width of the reactant outlet manifold. In an exemplary design involving a repeating unit (e.g. FIG. 2b), each port is located at a relative low point along the surface of the divider, adjacent a separating wall. (However, a sufficient distance may be provided between the first port and the fuel cell stack drain in order to provide available volume for pooled water without blocking outlet ducts.) In determining the open area of the ports, consideration has to be given with regards to pressure drop. For instance, in embodiments where the separating walls separate the manifold inlets into groups connected to N fuel cells, an appropriate open area for the ports can be about $1/16$ of the product of the length and width of the reactant outlet manifold divided by N. However, other amounts for the open area for the ports may be preferred and further, the ports in different groups may even be of different size.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, the invention is particularly useful for preventing ice blockages in the oxidant outlet manifolds of such fuel cell stacks. However, it may also be useful in the fuel outlet manifolds of fuel cell stacks as well. Such modifications are to be considered within the purview and scope of the claims appended hereto.

What is claimed is:

1. A solid polymer electrolyte fuel cell stack comprising a plurality of solid polymer electrolyte fuel cells stacked in series, each fuel cell comprising an anode, a cathode, a solid polymer electrolyte, at least one reactant inlet duct, and at least one reactant outlet duct, and the stack comprising a reactant outlet manifold having a length, width, and height, wherein the reactant outlet manifold comprises a manifold outlet and a plurality of manifold inlets fluidly connected to the reactant outlet ducts of each fuel cell, wherein the reactant outlet manifold comprises:

a closed end region and an open end region, a divider dividing the manifold into an upper duct section directly connected to the manifold inlets and a lower main flow section directly connected to the manifold outlet, wherein the divider comprises a plurality of ports fluidly connecting the upper duct section to the lower main flow section, the ports adapted for draining water from the upper duct section to the lower main flow section; and at least one separating wall in the upper duct section partially separating the upper duct section into flow segments, each flow segment including manifold inlets and at least one port, the separating wall adapted for directing part of the reactant flow from the upper duct section into the lower duct section via the ports, wherein the reactant is oxidant, the at least one reactant outlet duct is at least one oxidant outlet duct, and the reactant outlet manifold is an oxidant outlet manifold.

2. The fuel cell stack of claim 1 wherein the height of the duct section is half the height of the reactant outlet manifold, plus or minus 10%.

3. The fuel cell stack of claim 1 wherein the reactant outlet manifold comprises a plurality of separating walls in the duct section.

4. The fuel cell stack of claim 3 wherein the separating walls extend across 0.8 of the width of the reactant outlet manifold, plus or minus 10%.

5. The fuel cell stack of claim 1 wherein each port is partially separated from the other ports by a pair of the separating walls.

6. The fuel cell stack of claim 5 wherein each port is located adjacent a first one of the pair of the separating walls and distant from the second one of the pair of the separating walls.

7. The fuel cell stack of claim 5 wherein each port is located on the side of the divider opposite the reactant outlet ducts.

8. The fuel cell stack of claim 5 wherein the area of each port is 1/16 of the product of the length and width of the reactant outlet manifold divided by N, plus or minus 10%.

9. The fuel cell stack of claim 5 wherein the divider is tilted downwards from the second one towards the first one of the pair of the separating walls.

10. The fuel cell stack of claim 9 wherein the divider is tilted downwards at 20 degrees, plus or minus 10%.

11. The fuel cell stack of claim 1 wherein the surface of the divider comprises wicking features.

12. The fuel cell stack of claim 1 wherein the reactant manifold outlet comprises a unitary insert comprising the divider, the plurality of ports, and the at least one separating wall.

13. The fuel cell stack of claim 12 wherein the unitary insert is electrically insulating.

* * * * *